US011706853B2

(12) United States Patent
Voong et al.

(10) Patent No.: US 11,706,853 B2
(45) Date of Patent: Jul. 18, 2023

(54) MONITORING AN EMISSION STATE OF LIGHT SOURCES

(71) Applicant: Microsoft Technology Licensing, LLC, Redmond, WA (US)

(72) Inventors: Mike Voong, Daly City, CA (US); Martin Francis Galinski, III, Santa Clara, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/450,154

(22) Filed: Oct. 6, 2021

(65) Prior Publication Data

US 2023/0105312 A1    Apr. 6, 2023

(51) Int. Cl.
*H05B 45/14*    (2020.01)
*G06F 3/01*    (2006.01)

(52) U.S. Cl.
CPC ............. *H05B 45/14* (2020.01); *G06F 3/013* (2013.01)

(58) Field of Classification Search
CPC ........ H05B 45/14; H05B 45/24; H05B 45/37; H05B 45/3725; H05B 45/375; H05B 45/325; H05B 47/14; H05B 45/50–59; G06F 3/013
See application file for complete search history.

(56) References Cited

U.S. PATENT DOCUMENTS

| 2003/0198393 A1* | 10/2003 | Berstis | H04N 13/194 348/E13.071 |
| 2006/0082332 A1* | 4/2006 | Ito | H05B 45/50 315/77 |
| 2010/0079124 A1* | 4/2010 | Melanson | H02M 3/158 323/283 |
| 2010/0327765 A1* | 12/2010 | Melanson | H02M 3/3374 363/16 |

(Continued)

FOREIGN PATENT DOCUMENTS

WO    2013102549 A1    7/2013

OTHER PUBLICATIONS

"International Search Report and Written Opinion Issued in PCT Application No. PCT/US22/038253", dated Nov. 7, 2022, 13 Pages.

*Primary Examiner* — Abdullah A Riyami
*Assistant Examiner* — Syed M Kaiser
(74) *Attorney, Agent, or Firm* — Alleman Hall Creasman & Tuttle LLP

(57) ABSTRACT

Examples are disclosed that relate to monitoring an emission state of light sources. One example provides a light emitting circuit comprising a power source, one or more light sources connected to an output of the power source, and a control circuit comprising a pulsed voltage source and a control transistor configured to regulate a current through the light sources based upon an output of the pulsed voltage source. The light emitting circuit further comprises a monitor transistor comprising a gate connected to an output of the light (Continued)

sources such that a voltage at the output of the light sources controls an output of the monitor transistor, and a monitor transistor detector connected to the output of the monitor transistor. The monitor transistor detector is configured to monitor a state of the one or more light sources based upon a state of the output of the monitor transistor.

20 Claims, 5 Drawing Sheets

(56) References Cited

U.S. PATENT DOCUMENTS

| | | | |
|---|---|---|---|
| 2012/0306407 A1* | 12/2012 | He | H05B 45/382 |
| | | | 315/297 |
| 2017/0150563 A1* | 5/2017 | Lee | H05B 47/175 |
| 2018/0160515 A1* | 6/2018 | Ichikawa | H05B 47/25 |
| 2018/0329489 A1 | 11/2018 | Price et al. | |
| 2020/0084847 A1 | 3/2020 | Wang et al. | |
| 2020/0284883 A1* | 9/2020 | Ferreira | G01S 17/10 |
| 2021/0041567 A1 | 2/2021 | Milgrome et al. | |

\* cited by examiner

MONITORING AN EMISSION STATE OF LIGHT SOURCES

BACKGROUND

Eye tracking may be used in computing systems to detect user inputs made by gazing at virtual and/or real objects. For example, a computing device may be configured to detect user interactions with a displayed user interface by detecting a location on the user interface at which the user gazes, and registering an input at that location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to circuitry configured to monitor an emission state of one or more light sources. One example provides a light emitting circuit comprising a power source, one or more light sources connected to an output of the power source, and a control circuit comprising a pulsed voltage source and a control transistor configured to regulate a current through the one or more light sources based upon an output of the pulsed voltage source. The light emitting circuit further comprises a monitor transistor comprising a gate connected to an output of the one or more light sources such that a voltage at the output of the one or more light sources controls an output of the monitor transistor. The light emitting circuit further comprises a monitor transistor detector connected to the output of the monitor transistor, wherein the monitor transistor detector is configured to monitor a state of the one or more light sources based upon a state of the output of the monitor transistor.

DETAILED DESCRIPTION

Wearable devices utilizing eye tracking systems may use a camera and a plurality of light sources directed towards an eye to determine a direction of a gaze of the eye. Images capturing a pupil of an eye and reflections of the light sources from the cornea of the eye can be used in combination with anatomical information to determine a direction of gaze. In some eye tracking systems, infrared light sources may be used for eye tracking so that the light emitted by the light sources is not visible to users.

Light sources of an eye tracking system may be pulsed to manage an amount of light to which the eye is exposed. However, if the pulsing circuit fails, a user may be unaware of the failure, particularly where infrared light sources are used.

Accordingly, examples are disclosed that relate to the use of a light source monitor circuit to monitor the operation of a pulsed light source, such as one used in an eye tracking system. Briefly, the disclosed examples utilize a monitor transistor comprising a gate connected to an output of one or more light sources used for eye tracking, and a monitor transistor detector connected to the output of the monitor transistor. As described in more detail below, a voltage at the output of the one or more light sources controls an output of the monitor transistor. The monitor transistor detector monitors a time duration of each "on" state of the light sources, and outputs a signal when the "on" state exceeds a threshold duration. Examples are also disclosed that relate to a control transistor fault detector configured to detect a fault in a control transistor that regulates a current through the one or more light sources.

Figure 1:
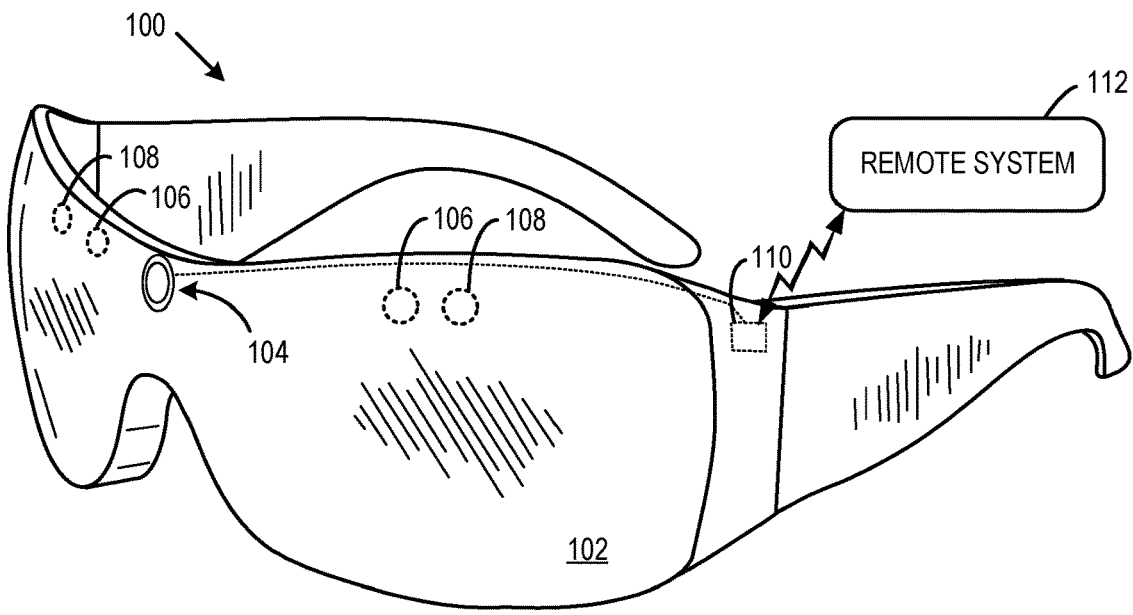
FIG. 1 shows an example computing system in the form of a head-mounted display.

Prior to discussing these circuits in detail, FIG. 1 shows an example computing system that may utilize eye tracking for user inputs. The depicted computing system takes the form of a head-mounted display device 100 comprising an augmented reality (AR) display 102. The AR display 102 may comprise any suitable display mechanism (e.g., a scanned beam projector or microdisplay (e.g. an LCoS microdisplay) with a waveguide-based or prism-based combiner, as examples) to display virtual imagery over a real-world background viewable through a combiner. Images displayed on AR display 102 may comprise stereoscopic images of virtual objects overlayed on the real-world scene such that the virtual objects appear to be present in the real-world scene. Display device 100 also comprises an outward-facing camera system, depicted schematically at 104, which may comprise one or more of a depth camera system (e.g., time-of-flight camera, structured light camera, or stereo camera arrangement), an intensity camera (RGB, grayscale, or infrared), and/or other suitable imaging device. Imagery from outward-facing camera system 104 can be used to form a map of an environment. As a more specific example, raw depth data from depth images of different regions of the use environment can be used to construct a point cloud depth representation of the use environment. This point cloud representation then may be used to form a surface reconstruction of the environment.

Display device 100 further comprises an eye tracking system to track a direction of a gaze of an eye of a user. The eye tracking system for each eye comprises one or more eye tracking cameras, illustrated schematically at 106, and one or more light sources, illustrated schematically at 108. Each light source 108 comprises one or more emitters configured to direct a beam of light (e.g. infrared light) toward the cornea of the eye. Image data from each eye tracking camera is analyzed to determine the location of a reflection from each light source and a location of the pupil of the eye. The reflection and pupil location data may then be used to track a direction of a gaze of the eye. In the depicted example, the light source(s) 108 and corresponding eye tracking camera 106 are depicted as being positioned above the eye. In other examples, the eye tracking camera and light sources may be positioned below the eye, to a side of the eye, or in any other suitable location.

Display device 100 also comprises a controller 110 and a communication subsystem for communicating via a network with one or more remote computing systems 112. Controller 110 comprises, among other components, a logic subsystem and a storage subsystem that stores instructions executable by the logic subsystem to control the various functions of display device 100. Examples of such functions are described in more detail below.

Figure 2:
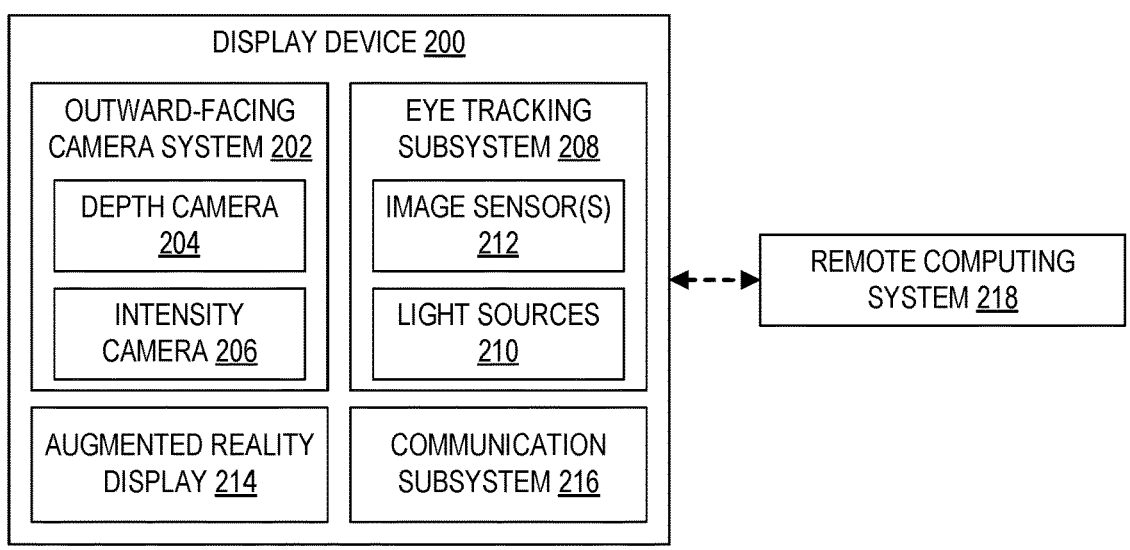
FIG. 2 shows a block diagram of an example wearable device.

FIG. 2 shows a block diagram of an example display device 200. Display device 100 is an example implementation of display device 200. As described above with regard to FIG. 1, display device 200 comprises an outward-facing camera system 202 including a depth camera 204 and/or intensity camera 206. Display device 200 also comprises an eye tracking subsystem 208. Eye tracking subsystem 208 comprises one or more light sources 210, and one or more image sensors 212 each configured to capture an image of an eye of the user. Display device 200 further comprises an augmented reality display system 214 and a communication subsystem 216 to communicate with one or more remote computing systems 218.

Figure 3:
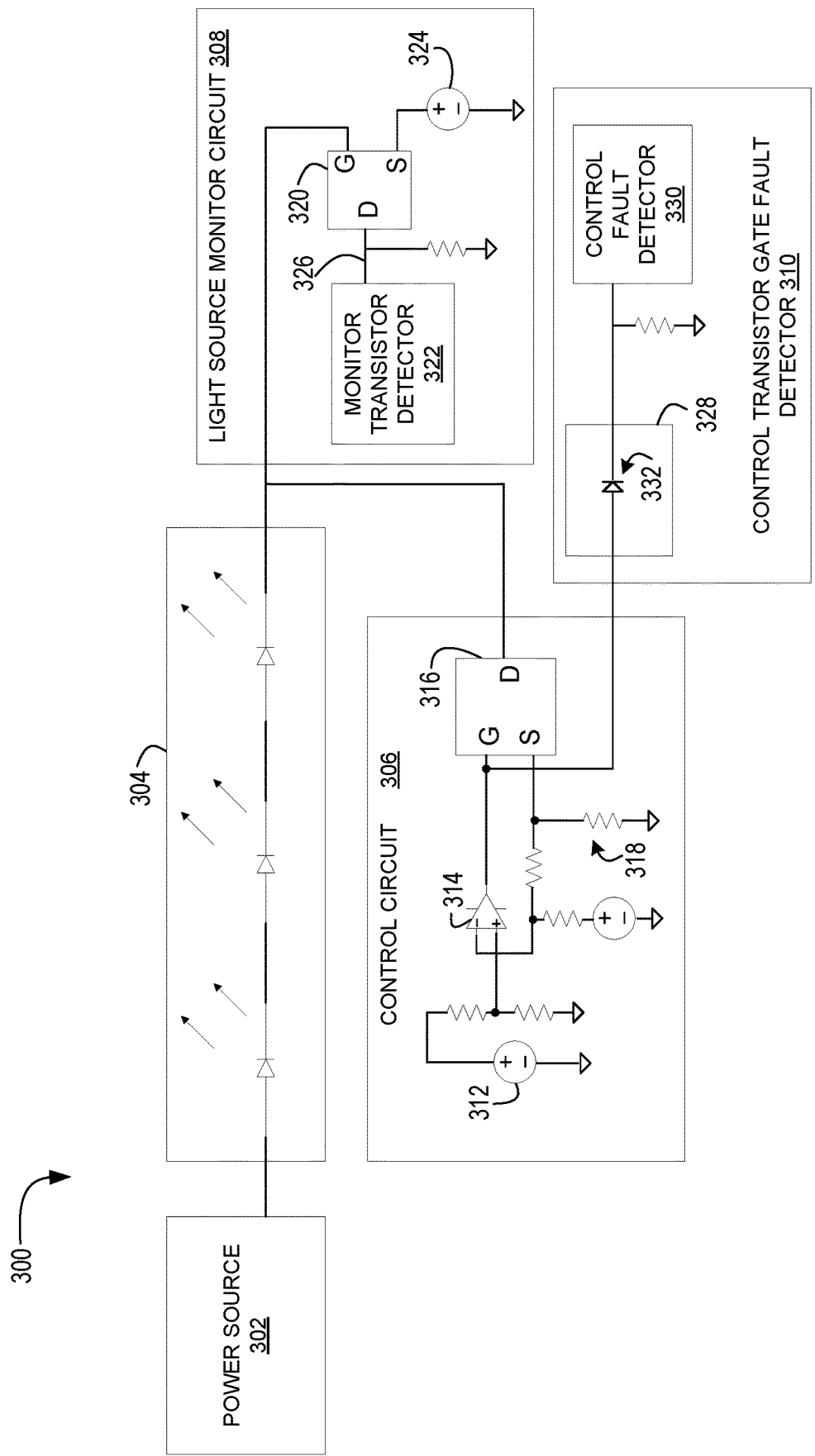
FIG. 3 shows a schematic diagram of an example light emitting circuit.

FIG. 3 shows a schematic diagram of an example circuit for controlling the operation of one or more lights of an eye tracking system. Circuit 300 may be used to control the light sources of display devices 100 and 200, for example. Circuit 300 comprises a power source 302, such as a boost voltage regulator, a battery, and/or any other suitable power source circuitry. Circuit 300 further comprises a plurality of light sources 304, which may emit infrared (IR) light or light of any other suitable wavelength(s). In some examples, the plurality of light sources 304 comprises one or more light emitting diodes (LED), while in other examples the plurality of light sources 304 may comprise any other suitable type of light emitter(s). While the depicted example comprises a plurality of light sources, in other examples, a single light source may be used.

Circuit 300 further comprises a control circuit 306 configured to control the emission of light by the plurality of light sources 304, and a light source monitor circuit 308 configured to monitor the "on" time for the plurality of light sources 304. Thereby, light source monitor circuit 308 may detect if the plurality of light sources 304 are "on" for greater than a threshold duration of emission. In the depicted example, circuit 300 further comprises an optional control transistor gate fault detector circuit 310, discussed in more detail below.

Control circuit 306 comprises a pulsed voltage source 312, an error amplifier 314, and a control transistor 316 configured to regulate a current through plurality of light sources 304 based upon an output of pulsed voltage source 312, and thereby control emission of light by the plurality of light sources 304. As a specific example, error amplifier 314 is configured to output a pulsed voltage based upon the output of pulsed voltage source 312 and a voltage across resistor 318.

In the depicted example, when the voltage on gate G of control transistor 316 is high, control transistor 316 is "on" and current flows from drain D to source S of control transistor 316. In this state, current flows through plurality of light sources 304 and resistor 318. When the voltage on gate G of control transistor is low, control transistor 316 is "off", and no current flows from the drain D to source S of control transistor 316. The depicted example control circuit 306 is illustrative, and any other suitable circuit may be used as control circuit 306 in other examples.

Light source monitor circuit 308 comprises a monitor transistor 320 and a monitor transistor detector 322. Monitor transistor 320 comprises a gate G connected to the output of plurality of light sources 304 such that a voltage on the output of plurality of light sources 304 controls an output of monitor transistor 320. Monitor transistor detector 322 is connected to the output of monitor transistor 320. In the depicted example, monitor transistor 320 comprises a p-channel field effect transistor (PFET) comprising a drain D connected to monitor transistor detector 322 and a source S connected to a power supply 324, such as a 3.3-volt supply or other suitable power supply. The use of a PFET may provide a simpler circuit and/or a smaller circuit area footprint than other implementations of monitor transistor 320.

When a voltage on the gate G of the monitor transistor 320 is low, indicating current flow through plurality of light sources 304, the output of monitor transistor 320, indicated as node 326, is driven high. Monitor transistor detector 322 is configured to monitor the voltage on node 326, and to output an indication when a state of plurality of light sources 304 corresponds to light from plurality of light sources 304 exceeding a threshold duration of emission. Monitor transistor detector 322 may comprise a counter circuit, an RC timer circuit, and/or any other suitable circuitry for monitoring an "on" time of the light sources based upon a voltage at node 326. In other examples, monitor transistor detector 322 may be configured as a controller comprising a pin connected to node 326 and software and/or firmware instructions executable to track the duration of "on" time for the light sources. In this manner, monitor transistor 320 and monitor transistor detector 322 may detect and output an indication of when a threshold duration of light emission is exceeded.

Control transistor gate fault detector circuit 310 is configured to detect a fault in which a voltage at gate G of control transistor 316 is pinned to a supply voltage. This may occur, for example, if resistor 318 shorts to ground, causing source S of control transistor 316 to be held at ground. In such an example, error amplifier 314 can pin voltage on gate G of control transistor 316 to a supply rail, thereby leading to unpulsed current flow through plurality of light sources 304. Thus, optional control transistor gate fault detector circuit 310 may be used to detect such a fault.

Control transistor gate fault detector circuit 310 comprises a control transistor gate monitor circuit 328 and a control transistor fault detector 330. Control transistor gate monitor circuit 328 is connected to the gate G of control transistor 316, such that the voltage at the gate G of control transistor 316 controls an output of control transistor gate monitor circuit 328. In the depicted example, control transistor gate monitor circuit 328 comprises a diode 332. Diode 332 may separate currents in control transistor fault detector 330 from control circuit 306. In other examples, control transistor gate monitor circuit 328 may comprise any other suitable configuration.

Control transistor fault detector 330 is configured to monitor a state of the voltage at the gate G of control transistor 316 based upon a state of the output of control transistor gate monitor circuit 328. When the voltage of the gate G of control transistor 316 is pinned to a supply rail, control transistor 316 may not correctly regulate the current through plurality of light sources 304 in such a manner to pulse light from plurality of light sources 304. Thus, control transistor fault detector 330 may detect a duration for which the voltage at the gate G of control transistor 316 is pinned at a supply voltage, and output an indication when the duration exceeds a threshold. Control transistor fault detector 330 may comprise a counter circuit, an RC timer circuit, a controller configured with timing firmware or software, and/or any other suitable detector circuitry in various examples.

Figure 4:
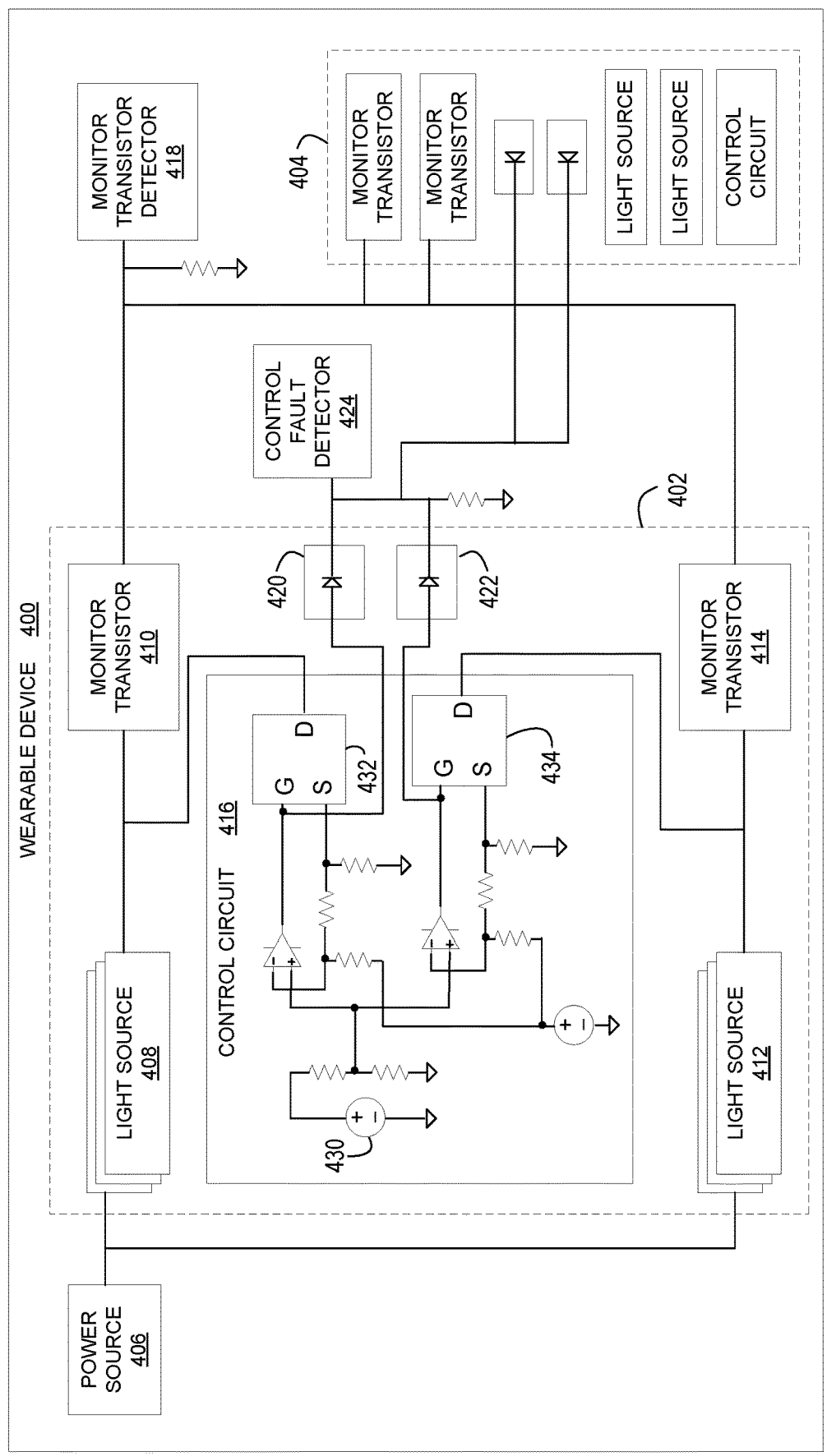
FIG. 4 shows a block diagram of an example wearable device comprising a plurality of light sources.

FIG. 4 shows an example wearable device in which the circuit of FIG. 3 can be used. Wearable devices 100 and 200 are example implementations of wearable device 400. Wearable device 400 comprises a power source 406, a first eye tracking light source circuit 402, and a second eye tracking light source circuit 404. First eye tracking light source circuit 402 may be used for tracking a direction of a gaze of a first eye and second eye tracking light source circuit 404 may be used for tracking a direction of a gaze of a second eye. The following description of wearable device 400 is made with regard to first eye tracking light source circuit 402, and it is to be understood that second eye tracking light source circuit 404 may operate similarly. Second eye tracking light source circuit 404 is shown in simplified form, but it will be understood that second eye tracking light source circuit 404 can comprise similar components to first eye tracking light source circuit 402.

First eye tracking light source circuit 402 comprises a first plurality of light sources 408 connected to an output of power source 406, a first monitor transistor 410, a second plurality of light sources 412 connected to the output of power source 406, and a second monitor transistor 414. Wearable device 400 further comprises a control circuit 416 connected to an output of first plurality of light sources 408 and an output of second plurality of light sources 412, and a monitor transistor detector 418 configured to monitor an output of first and second monitor transistors 410, 414. Wearable device 400 further comprises an optional first control transistor gate monitor circuit 420, an optional second control transistor gate monitor circuit 422, and an optional control transistor fault detector 424 connected to optional first control transistor gate monitor circuit 420 and optional second control transistor gate monitor circuit 422.

First plurality of light sources 408 and second plurality of light sources 412 are each configured to direct light toward an eye of a user for eye tracking. In some examples, first plurality of light sources 408 and second plurality of lights sources 412 each may comprise light emitting diodes (LEDs), while in other examples, any other types of light sources may be used. In some examples, a single light source may be used in place of first plurality of light sources 408, and/or a single light source may be used in place of second plurality of light sources 412. First and second plurality of light sources 408 and 412 may emit infrared (IR) light, or light of any other suitable wavelength(s), in various examples.

First monitor transistor 410 comprises a gate G connected to an output of first plurality of light sources 408 such that a voltage at the output of the first plurality of light sources 408 controls an output of first monitor transistor 410. Second monitor transistor 414 similarly comprises a gate G connected to an output of second plurality of light sources 412 such that a voltage at the output of the second plurality of light sources 412 controls an output of second monitor transistor 414. As described above with regard to FIG. 3, first monitor transistor 410 and second monitor transistor 414 each may comprise a p-channel field effect transistor (PFET). A PFET may provide a simpler circuit and smaller circuit area footprint than other implementations of first and second monitor transistors 410 and 414 in the depicted circuit. However, in other examples, any other suitable type of transistor(s) may be used for first monitor transistor 410 and second monitor transistor 414.

Monitor transistor detector 418 is connected to an output of first monitor transistor 410 and an output of second monitor transistor 414. Monitor transistor detector 418 may be configured to output an indication when one or more of a state of first plurality of light sources 408 and a state of second plurality of light sources 412 corresponds to light emission exceeding a threshold duration.

Control circuit 416 comprises a pulsed voltage source 430, a first control transistor 432 configured to regulate a current though first plurality of light sources 408 based upon an output of pulsed voltage source 430, and a second control transistor 434 configured to regulate a current though second plurality of light sources 412 based upon an output of pulsed voltage source 430. The depicted example control circuit 416 is illustrative, and any other suitable circuit may be used as a control circuit in other examples.

First control transistor gate monitor circuit 420 is connected to a gate G of first control transistor 432 such that a voltage at the gate G of first control transistor 432 controls an output of first control transistor gate monitor circuit 420. Similarly, second control transistor gate monitor circuit 422 is connected to a gate G of second control transistor 434 such that a voltage at the gate G of second control transistor 434 controls an output of second control transistor gate monitor circuit 422. First control transistor gate monitor circuit 420 and second control transistor gate monitor circuit 422 are each configured to detect a voltage pinned to a power supply, as described above for circuit 300. In the depicted example, first control transistor gate monitor circuit 420 and second control transistor gate monitor circuit 422 each comprise a diode. Such a configuration may isolate voltages and/or currents on a gate of one control transistor from a gate of another control transistor. As a specific example, the diode of second control transistor gate monitor circuit 422 protects gate G of first control transistor 432 from a voltage pinned at a power supply, as described above, on the gate G of second control transistor 434. In other examples, the first and second control transistor gate monitor circuits 420, 422 can have any other suitable circuit elements.

Control transistor fault detector 424 may be configured to output an indication when one or more of a state of a voltage at the gate G of first control transistor 432 and a state of a voltage at the gate G of second control transistor 434 corresponds to a voltage pinned at a power supply.

Figure 5:
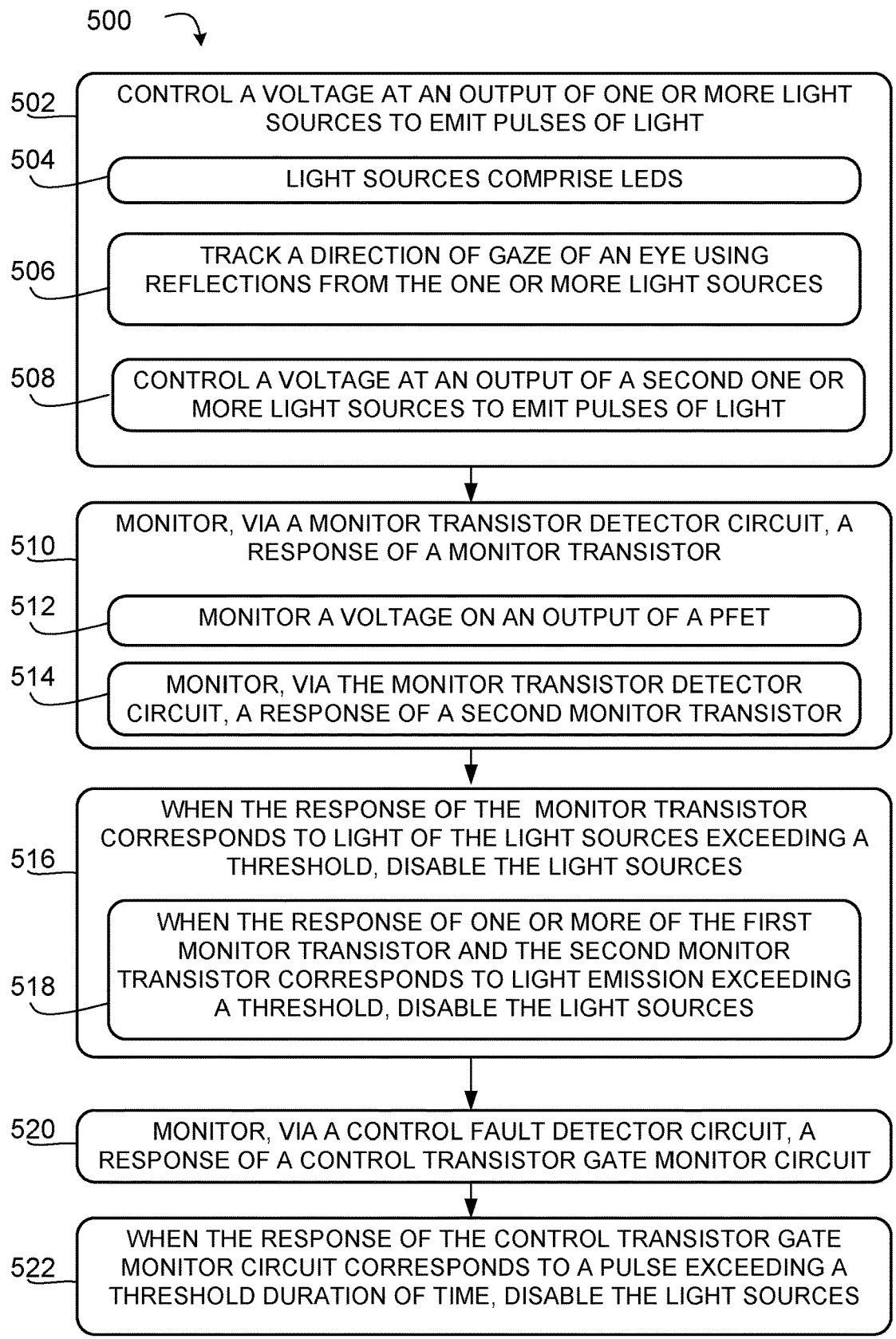
FIG. 5 shows a flow diagram of an example method for controlling one or more light sources.

FIG. 5 depicts a flow diagram of example method 500 for operating a wearable device comprising one or more light sources. For example, method 500 may be performed on any of the examples described above with regards to FIG. 1-4. Method 500 comprises, at 502, controlling voltage at an output of the one or more light sources to emit pulses of light. In some examples, the one or more light sources comprise light emitting diodes (LEDs), while in other examples any other suitable type of light source(s) may be controlled. As indicated at 506, the pulses of light may be used to track an eye gaze direction by imaging the locations of reflections of the one or more light sources from an eye, at 506. In some examples, the one or more light sources may comprise infrared (IR) light sources, while in other examples the one or more light sources may be configured to emit any other suitable wavelength(s) of light. In some examples, the wearable device may further comprise a second one or more light sources, and possibly additional light sources, depending upon a configuration of an eye tracking system. In such examples, method 500 further comprises, at 508, controlling a voltage at an output of the second one or more light sources to emit pulses of light, and controlling voltages at the outputs of any additional light sources to similarly emit pulses of light.

Method 500 further comprises, at 510, monitoring, via a monitor transistor detector, a response of a monitor transistor comprising a gate connected to the output of the one or more light sources. The response may comprise a voltage response, a current response, or any other suitable response. In some examples, method 500 may comprise monitoring a voltage on an output of a p-channel field effect transistor (PFET), as indicated at 512. In other examples, any other type of transistor may be used as a monitor transistor. In the examples comprising a second one or more light sources, method 500 further comprises, at 514, monitoring, via the monitor transistor detector, a response of a second monitor transistor comprising a gate connected to the output of the second one or more light sources. Any additional light sources can be monitored similarly with corresponding monitor transistors.

Continuing, method 500 comprises, at 516, disabling the one or more light sources when the response of the monitor transistor corresponds to light of the light sources exceeding a threshold duration of emission. In examples comprising the second monitor transistor, method 500 further comprises, at 518, when the response of one or more of the first monitor transistor and the second monitor transistor corresponds to light emission exceeding a threshold duration of emission, disabling the light sources.

In some examples, method 500 may further comprise monitoring, via a control transistor fault detector, a response of a control transistor gate monitor circuit, at 520. In such examples, method 500 further comprises, at 522, when the response of the control transistor gate monitor circuit corresponds to a pulse exceeding a threshold duration of time, disabling the light sources. The pulse may comprise a voltage pulse on a gate of a control transistor in a control circuit.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
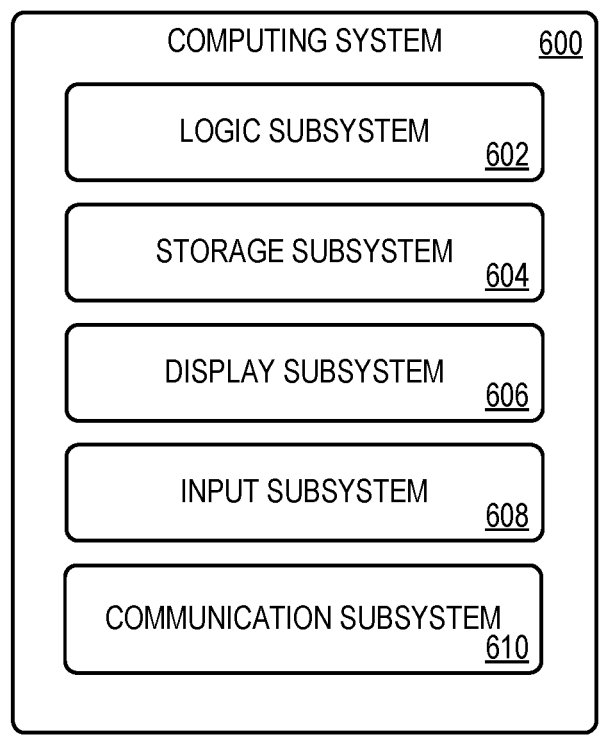
FIG. 6 shows a block diagram of an example computing system.

FIG. 6 schematically shows a non-limiting embodiment of a computing system 600 that can enact one or more of the methods and processes described above. Wearable device 100, wearable device 200, and wearable device 400 are examples of computing system 600. Circuit 300 is an example of a circuit that can be incorporated in computing system 600. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices, such as a wearable device as described in FIGS. 1, 2, and 4.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 604 includes one or more physical devices configured to hold instructions executable by the logic machine to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic subsystem 602 executing instructions held by storage subsystem 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a light emitting circuit comprising a power source, one or more light sources connected to an output of the power source, a control circuit comprising a pulsed voltage source, and a control transistor configured to regulate a current through the one or more light sources based upon an output of the pulsed voltage source, a monitor transistor comprising a gate connected to an output of the one or more light sources such that a voltage at the output of the one or more light sources controls an output of the monitor transistor, and a monitor transistor detector connected to the output of the monitor transistor, the monitor transistor detector configured to monitor a state of the one or more light sources based upon a state of the output of the monitor transistor. In some such examples, the monitor transistor detector is alternatively or additionally configured to output an indication when the state of the one or more light sources corresponds to light from the one or more light sources exceeding a threshold duration of emission. In some such examples, the one or more light sources alternatively or additionally comprises one or more light emitting diodes (LED). In some such examples, the one or more light sources alternatively or additionally comprise eye tracking light sources. In some such examples, the monitor transistor alternatively or additionally comprises a p-channel field effect transistor (PFET). In some such examples, a source of the PFET is alternatively or additionally connected to a power supply. In some such examples, alternatively or additionally comprising a control transistor gate fault detector comprising a control transistor gate monitor circuit connected to a gate of the control transistor such that a voltage at the gate of the control transistor controls an output of the control transistor gate monitor circuit, and a control transistor fault detector connected to the output of the control transistor gate monitor circuit, the control transistor fault detector configured to monitor a state of the voltage at the gate of the control transistor based upon a state of the output of the control transistor gate monitor circuit. In some such examples, the control transistor gate monitor circuit alternatively or additionally comprises a diode.

Another example provides a wearable device comprising a power source, one or more infrared (IR) light sources configured to direct light toward an eye for eye tracking, the one or more IR light sources connected to an output of the power source, a control circuit comprising a pulsed voltage source and a control transistor configured to regulate a current through the one or more IR light sources based upon an output of the pulsed voltage source, a monitor transistor comprising a gate connected to an output of the one or more IR light sources such that a voltage at the output of the one or more IR light sources controls an output of the monitor transistor, and a monitor transistor detector connected to the output of the monitor transistor, the monitor transistor detector configured to monitor a state of the one or more IR light sources based upon a state of the output of the monitor transistor. In some such examples, the monitor transistor detector is alternatively or additionally configured to output an indication when the state of the one or more IR light sources corresponds to light from the one or more IR light sources exceeding a threshold duration of emission. In some such examples, the monitor transistor alternatively or additionally comprises a p-channel field effect transistor (PFET). In some such examples, the one or more IR light sources alternatively or additionally comprises one or more light emitting diodes (LED). In some such examples, the one or more IR light sources is a first one or more IR light sources, the monitor transistor is a first monitor transistor, and the device alternatively or additionally comprises a second one or more IR light sources connected to the output of the power source, and a second monitor transistor comprising a gate connected to an output of the second one or more IR light sources such that a voltage at an output of the second one or more IR light sources controls an output of the second monitor transistor, and an output connected to the monitor transistor detector. In some such examples, the monitor transistor detector is alternatively or additionally configured to output an indication when one or more of the state of the first one or more IR light sources and a state of the second one or more IR light sources corresponds to light emission exceeding a threshold duration of emission.

Another example provides a method enacted on a wearable device comprising one or more infrared (IR) light sources, a monitor transistor comprising a gate connected to an output of the one or more IR light sources, and a monitor transistor detector connected to an output of the monitor transistor, the method comprising controlling a voltage at the output of the one or more IR light sources to emit pulses of light, monitoring, via the monitor transistor detector, a response of the output of the monitor transistor, and when the response corresponds to light from the one or more IR light sources exceeding a threshold duration of emission, disabling the one or more IR light sources. In some such examples, the wearable device alternatively or additionally comprises a control circuit comprising a control transistor configured to regulate a current through the one or more IR light sources, a control transistor gate monitor circuit connected to a gate of the control transistor, and a control transistor fault detector connected to an output of the control transistor gate monitor circuit, and wherein the method alternatively or additionally comprises monitoring, via the control transistor fault detector, a response of the output of the control transistor gate monitor circuit, when the response of the control transistor gate monitor circuit corresponds to a pulse exceeding a threshold duration of time, disabling the one or more IR light sources. In some such examples, the one or more IR light sources is a first one or more light sources, the monitor transistor is a first monitor transistor, wherein the device alternatively or additionally comprises a second one or more IR light sources, a second monitor transistor comprising a gate connected to an output of the second one or more IR light sources and an output connected to the monitor transistor detector, and wherein the method alternatively or additionally comprises controlling voltage at the output of the second one or more IR light sources to emit pulses of light, monitoring, via the monitor transistor detector, a response of the output of the second monitor transistor, and when the response of one or more of the output of the first monitor transistor and the output of the second monitor transistor corresponds to light exceeding the threshold duration of emission, disabling the first and second one or more IR light sources. In some such examples, the method alternatively or additionally comprises tracking a direction of gaze of an eye via the one or more IR light sources. In some such examples, monitoring the response of the output of the monitor transistor alternatively or additionally comprises monitoring a voltage on an output of a p-channel field effect transistor (PFET). In some such examples, controlling voltage at the output of the one or more IR light sources alternatively or additionally comprises emitting pulses of light via one or more light emitting diodes (LED).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A light emitting circuit comprising:
   a power source;
   one or more light sources connected to an output of the power source;
   a control circuit comprising a pulsed voltage source, and a control transistor configured to regulate a current through the one or more light sources based upon an output of the pulsed voltage source;
   a monitor transistor comprising a gate connected to an output of the one or more light sources such that a voltage at the output of the one or more light sources controls an output of the monitor transistor; and
   a monitor transistor detector connected to the output of the monitor transistor, the monitor transistor detector configured to monitor a state of the one or more light sources based upon a state of the output of the monitor transistor.

2. The circuit of claim 1, wherein the monitor transistor detector is further configured to output an indication when the state of the one or more light sources corresponds to light from the one or more light sources exceeding a threshold duration of emission.

3. The circuit of claim 1, wherein the one or more light sources comprises one or more light emitting diodes (LED).

4. The circuit of claim 1, wherein the one or more light sources comprise eye tracking light sources.

5. The circuit of claim 1, wherein the monitor transistor comprises a p-channel field effect transistor (PFET).

6. The circuit of claim 5, wherein a source of the PFET is connected to a power supply.

7. The circuit of claim 1, further comprising a control transistor gate fault detector comprising
   a control transistor gate monitor circuit connected to a gate of the control transistor such that a voltage at the gate of the control transistor controls an output of the control transistor gate monitor circuit, and
   a control transistor fault detector connected to the output of the control transistor gate monitor circuit, the control transistor fault detector configured to monitor a state of the voltage at the gate of the control transistor based upon a state of the output of the control transistor gate monitor circuit.

8. The circuit of claim 7, wherein the control transistor gate monitor circuit comprises a diode.

9. A wearable device comprising:
   a power source;
   one or more infrared (IR) light sources configured to direct light toward an eye for eye tracking, the one or more IR light sources connected to an output of the power source;
   a control circuit comprising a pulsed voltage source and a control transistor configured to regulate a current through the one or more IR light sources based upon an output of the pulsed voltage source;
   a monitor transistor comprising a gate connected to an output of the one or more IR light sources such that a voltage at the output of the one or more IR light sources controls an output of the monitor transistor; and
   a monitor transistor detector connected to the output of the monitor transistor, the monitor transistor detector configured to monitor a state of the one or more IR light sources based upon a state of the output of the monitor transistor.

10. The device of claim 9, wherein the monitor transistor detector is further configured to output an indication when the state of the one or more IR light sources corresponds to light from the one or more IR light sources exceeding a threshold duration of emission.

11. The device of claim 9, wherein the monitor transistor comprises a p-channel field effect transistor (PFET).

12. The device of claim 9, wherein the one or more IR light sources comprises one or more light emitting diodes (LED).

13. The device of claim 9, wherein the one or more IR light sources is a first one or more IR light sources, the monitor transistor is a first monitor transistor, and the device further comprises
   a second one or more IR light sources connected to the output of the power source, and
   a second monitor transistor comprising a gate connected to an output of the second one or more IR light sources such that a voltage at an output of the second one or more IR light sources controls an output of the second monitor transistor, and an output connected to the monitor transistor detector.

14. The device of claim 13, wherein the monitor transistor detector is configured to output an indication when one or more of the state of the first one or more IR light sources and a state of the second one or more IR light sources corresponds to light emission exceeding a threshold duration of emission.

15. A method enacted on a wearable device comprising one or more infrared (IR) light sources, a monitor transistor comprising a gate connected to an output of the one or more IR light sources, and a monitor transistor detector connected to an output of the monitor transistor, the method comprising:

controlling a voltage at the output of the one or more IR light sources to emit pulses of light;

monitoring, via the monitor transistor detector, a response of the output of the monitor transistor; and when the response corresponds to light from the one or more IR light sources exceeding a threshold duration of emission, disabling the one or more IR light sources.

16. The method of claim 15, wherein the wearable device further comprises a control circuit comprising a control transistor configured to regulate a current through the one or more IR light sources, a control transistor gate monitor circuit connected to a gate of the control transistor, and a control transistor fault detector connected to an output of the control transistor gate monitor circuit, and wherein the method further comprises monitoring, via the control transistor fault detector, a response of the output of the control transistor gate monitor circuit, when the response of the control transistor gate monitor circuit corresponds to a pulse exceeding a threshold duration of time, disabling the one or more IR light sources.

17. The method of claim 15, wherein the one or more IR light sources is a first one or more light sources, the monitor transistor is a first monitor transistor, wherein the device further comprises a second one or more IR light sources, a second monitor transistor comprising a gate connected to an output of the second one or more IR light sources and an output connected to the monitor transistor detector, and wherein the method further comprises controlling voltage at the output of the second one or more IR light sources to emit pulses of light, monitoring, via the monitor transistor detector, a response of the output of the second monitor transistor, and when the response of one or more of the output of the first monitor transistor and the output of the second monitor transistor corresponds to light exceeding the threshold duration of emission, disabling the first and second one or more IR light sources.

18. The method of claim 15, further comprising tracking a direction of gaze of an eye via the one or more IR light sources.

19. The method of claim 15, wherein monitoring the response of the output of the monitor transistor comprises monitoring a voltage on an output of a p-channel field effect transistor (PFET).

20. The method of claim 15, wherein controlling voltage at the output of the one or more IR light sources comprises emitting pulses of light via one or more light emitting diodes (LED).

* * * * *